April 8, 1952 G. T. BAKER 2,591,909
MULTIPLE OFFICE VOICE-FREQUENCY
LINE IDENTIFICATION SYSTEM
Filed May 27, 1946 8 Sheets-Sheet 1

INVENTOR
GEORGE THOMAS BAKER

BY
ATTORNEY

INVENTOR.
GEORGE T. BAKER

ATTORNEY

INVENTOR.
GEORGE T. BAKER
ATTORNEY

April 8, 1952  G. T. BAKER  2,591,909
MULTIPLE OFFICE VOICE-FREQUENCY
LINE IDENTIFICATION SYSTEM
Filed May 27, 1946  8 Sheets-Sheet 8
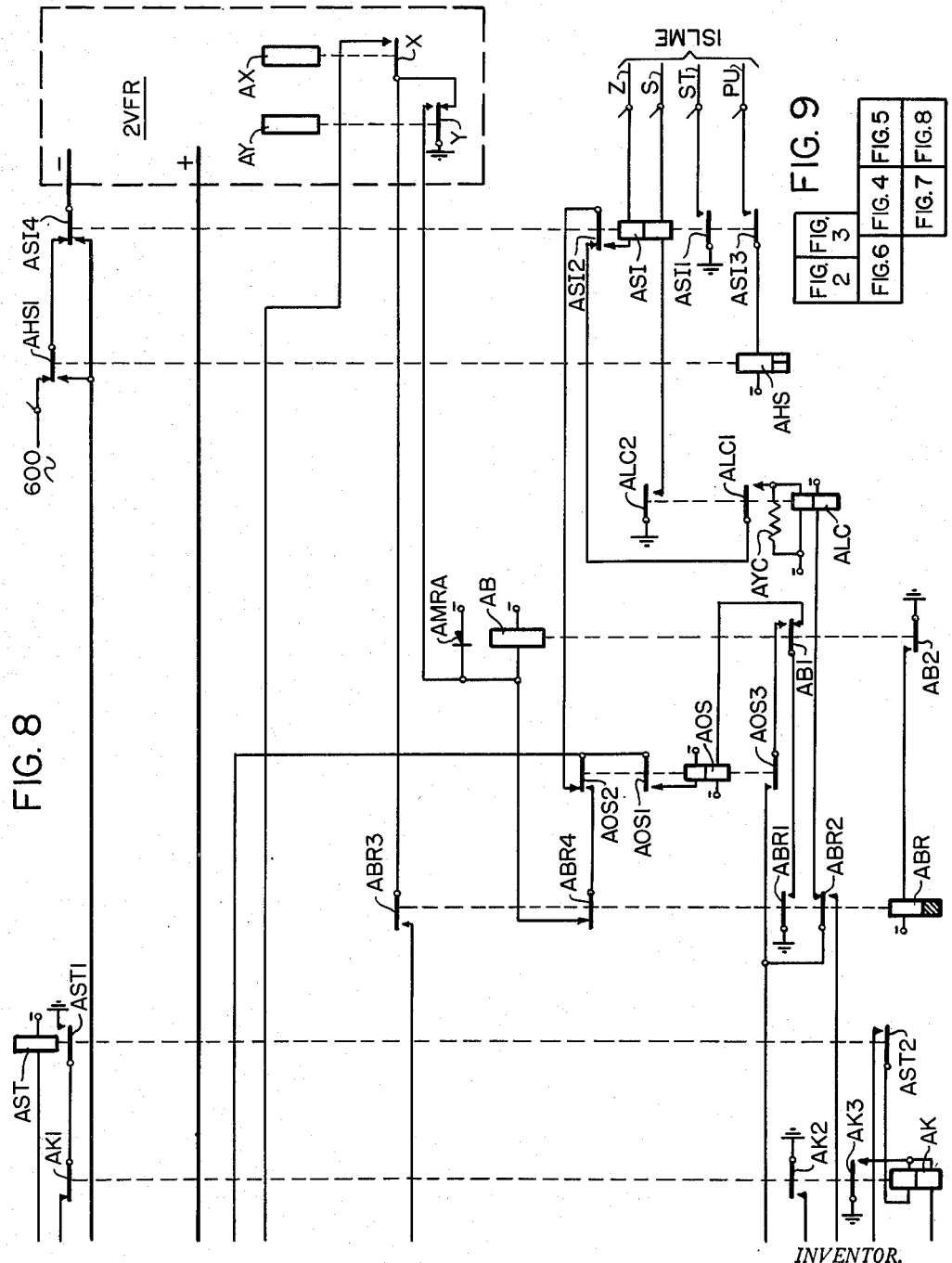
INVENTOR.
GEORGE T. BAKER
BY
ATTORNEY Patented Apr. 8, 1952

2,591,909

UNITED STATES PATENT OFFICE 2,591,909

MULTIPLE OFFICE VOICE-FREQUENCY LINE IDENTIFICATION SYSTEM

George Thomas Baker, Liverpool, England, assignor to Automatic Electric Laboratories Inc., Chicago, Ill., a corporation of Delaware Application May 27, 1946, Serial No. 672,386
In Great Britain June 13, 1945

12 Claims. (Cl. 179—7)

The present invention relates to telephone systems and is more particularly concerned with systems provided with a plurality of exchanges and having facilities for identifying calling lines at an originating exchange.

In many cases the identity of the calling line has to be transmitted from the originating exchange to a main exchange at which information relating to the call is collected, and this will, of course, involve transmission of signals over the local junction line from the originating exchange. It is desirable that this shall be done before the end of conversation in order that the local interexchange junction holding time shall not be unduly prolonged and the invention is particularly directed to the solution of this problem.

According to one feature of the invention, for the purpose of transferring information from the originating exchange to a main exchange, the speaking path between the two exchanges is momentarily seized by equipment which serves to transmit signals representative of the identity of the calling line over the speaking path.

According to another feature of the invention, in response to the reception at an originating exchange of the called party answer signal, calling line identification is initiated and the speaking path between calling and called parties is interrupted to provide a signalling path for the transmission of the calling line identification signals from the originating exchange to the exchange at which the information is to be collected.

According to a further feature of the invention, voice frequency signals are employed for the transmission of the identity of the calling line from an originating exchange to the exchange at which the information is collected and the reception at the originating exchange of a signal from the called end of the connection serves to set the calling line identification equipment in operation and to transfer the line extending between the two exchanges from the calling end of the connection to voice frequency signalling equipment arranged to transmit the appropriate signals under the control of the calling line identification equipment.

According to another feature of the invention, in response to the reception at an originating exchange of a signal from the called end of the connection, calling line identification is initiated and the junction line extending between the originating exchange and the exchange at which the information is collected is transferred from the calling party's line to voice frequency equipment arranged so that voice frequency pulses of one frequency are applied directly to the junction line and act as synchronising pulses while in the period between the synchronising pulses, pulses of a second frequency are or are not applied to the line as determined by the calling line identification equipment to enable the identity of the calling line to be transmitted in code.

Preferably the process of calling line identification and the transmission of the appropriate signals is arranged to take place substantially during the interval between the called party lifting his receiver and commencing conversation. The speaking path between the calling and called parties can thus be interrupted for identification and signal transmission with substantially no interference with conversation. Further as there is no conversation taking place at this time, voice frequency signalling is possible.

It will be appreciated that the use of the invention necessitates rapid identification and signal transmission and this is conveniently effected by employing a line identification system of the type disclosed in United States Patent No. 2,292,977 issued August 11, 1942, in which each line of the exchange has impressed on it a signal code characteristic of its number. This signal code is arranged to extend along either the conductor commonly designated as the P wire, provided for holding and guarding or the conductor, commonly designated as the M wire provided for metering of a connection set up therefrom to an outgoing auto/auto impulse repeater where it is transferred to the speaking conductors for transmission over the inter-exchange junction to the toll line relay set at the exchange at which the ticketing equipment is located. In this relay set the identity of the called subscriber will already be stored in code form, this information having been extracted during the dialling therethrough of the called party's number. Hence during conversation the identity of the calling and called parties will be stored in the toll line relay set while the timing of the call will be taking place in a separate timing relay set which functions on the basic principle disclosed in United States application Serial No. 672,387 filed May 27, 1946, now Patent No. 2,488,797, granted November 22, 1949, and which sets up the elapsed time in code form.

At the end of conversation, a common printer is taken into use and the coded information comprising the calling and called parties' numbers and the elapsed time is rapidly communicated in succession to the printer which is arranged to function directly from the storage code adopted for use, for instance a four-unit W, X, Y and Z code. The date and time of day will also be delivered to the printer in code from a date and time unit, while the necessary spacings, line returns and other symbols necessary to render intelligible the digit series which will be printed on the ticket will be interposed under control of a printer controlling circuit which is located between the toll line relay set and the printer.

The invention will be better understood from the following description of one method of carrying it into effect, reference being had to the accompanying drawings comprising Figs. 1-9.

Fig. 1 shows a trunking diagram of two automatic exchanges, St. Mary's SM, and Penrith, P, access from St. Mary's to toll lines requiring ticketing always being had via Penrith at which the ticketing equipment for both exchanges is located.

Figure 6:
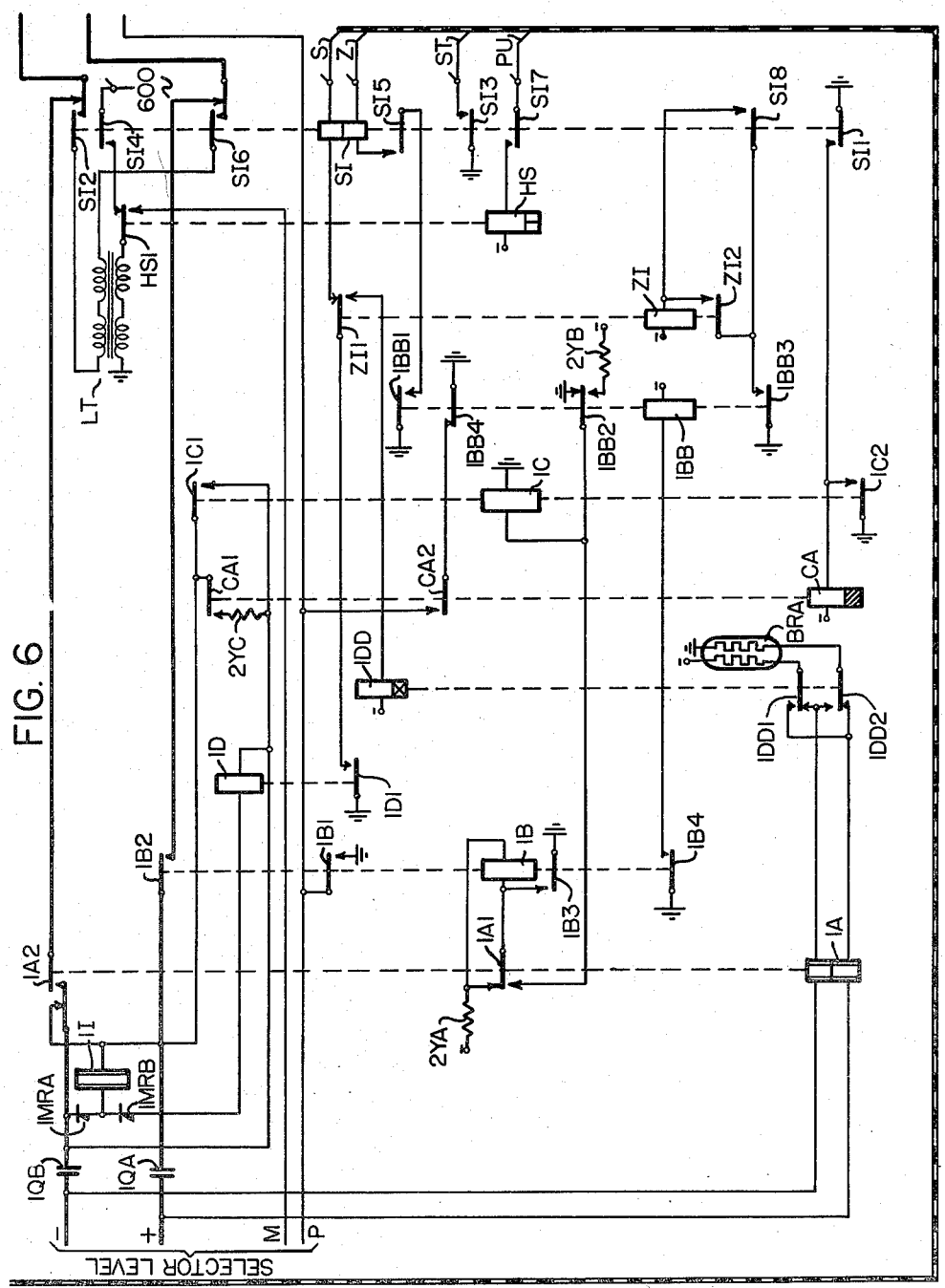

Fig. 6 shows the circuit of an auto/auto repeater AARS for use at St. Mary's and having facilities for transferring identification signals on to the St. Mary's - Penrith junction line conductors.

Figure 7:
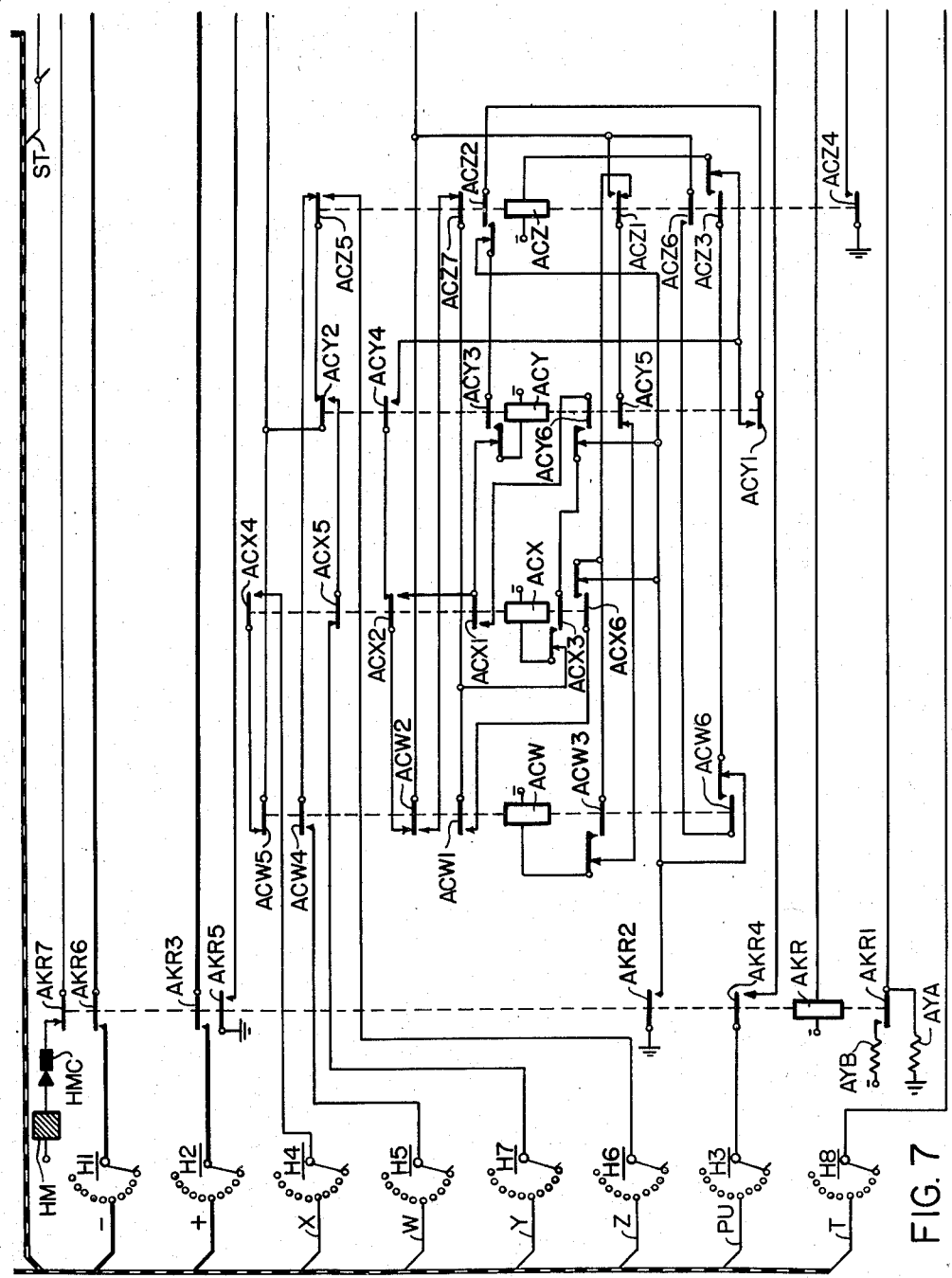

Figs. 7 and 8 show the circuit of an identification control relay set ICRS for use at Penrith.

Fig. 9 shows the manner in which Figs 2-8 are to be arranged.

Figure 1:
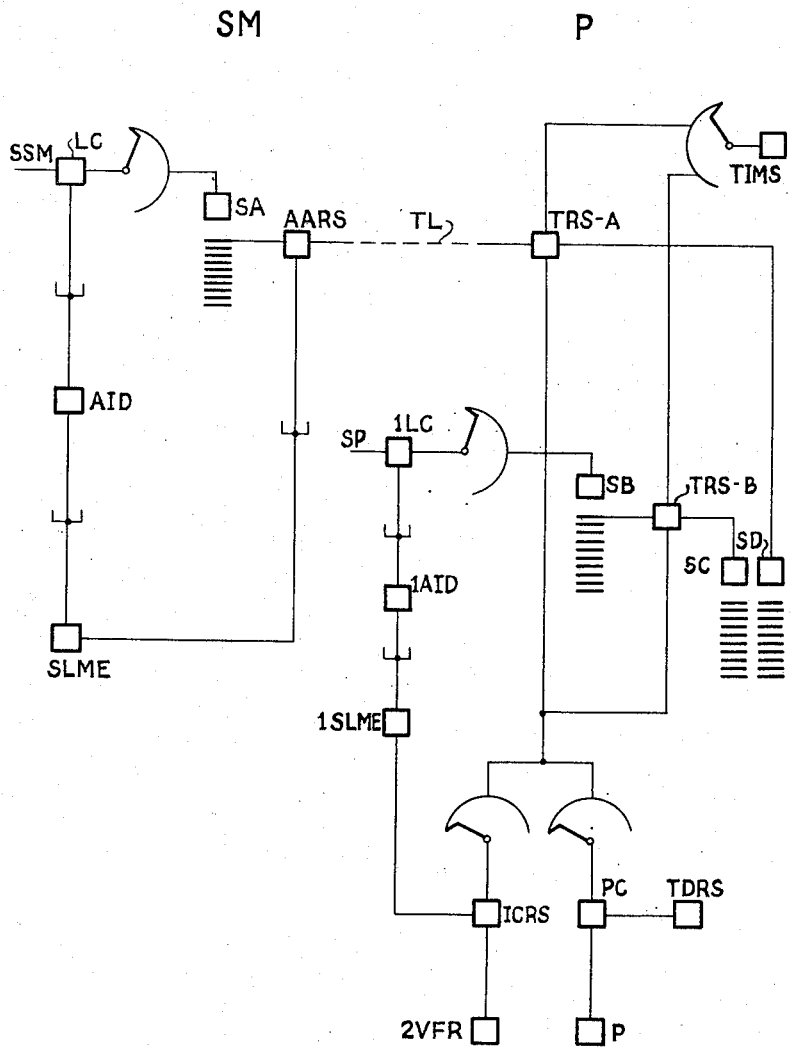

Referring now to the trunking diagram of Fig. 1, it will be seen that the ticketing equipment for both exchanges is centralised at the main exchange P, Penrith. All the information is stored on a toll line relay set TRS-A or TRS-B, according as to whether the call originates at exchange SM, St. Mary's or Penrith respectively, the toll line relay sets being located at the main or printing office, Penrith. At the end of a call, this information is transferred through the printer-controller PC to the printer P. The time and date circuit TDRS adds the appropriate details to the ticket and the printer is then released. Thus the printer is not taken into use until all the information is ready for it and it is released immediately the ticket is produced. This gives an extremely short holding time and enables one printer to serve for a large number of calls.

Briefly a toll call originating from the subscriber's line SSM at St. Mary's exchange is extended through the line circuit LC and first selector SA to the auto/auto repeater AARS associated with an idle junction line TL to the main exchange. The additional digits transmitted by the calling subscriber are repeated over the junction line TL to the toll line relay set TRS-A where they are stored for ticketing purposes. The digits are also repeated from TRS-A to set the selector SD which has access, for instance, to toll lines outgoing to other exchanges and to control the switches at the terminating exchange or intermediate and terminating exchanges.

The equipment remains in this condition until the called party replies when battery reversal into the auto/auto repeater, AARS, causes a start earth to be extended to the line marking equipment SIME. This applies identification signals to each line circuit via a block of non-linear resistance units which are preferably assembled as disclosed in United States application Serial No. 665,020 filed April 26, 1946.

These identification signals pass through the line circuit LC and first selector SA, which may be of the type disclosed in United States application Serial No. 647,598, filed February 14, 1946, now Patent No. 2,504,755, granted April 18, 1951, to the auto/auto repeater AARS at which point the 2-wire junction to the main exchange is appropriated momentarily to pass forward the identity by means of voice-frequency signals.

The actual deciphering of the signals is effected by the identification control relay set ICRS, which extends the V. F. signals into the 2 V. F. receiver 2VFR and distributes the output over the various components of the storage relays. This unit is held only during identification and one relay set will thus serve to deal with a large number of calls.

Also in response to the reply of the called party, the toll line relay set causes the timing relay set TIMS to be associated therewith to time the duration of the call.

At the end of the call, the printer-controller is associated with the toll line relay set over the hunting switch and the timing relay set is disconnected from the toll line relay set, the duration of the call having been registered therein. The information in the toll line relay set is now printed as previously described.

The operation on a call originating at Penrith is similar, the connection being extended from the subscriber's line SP through the line circuit LC1, first selector SB, toll line relay set TRS-B and outgoing selector SC, the bank contacts of which are multipled to corresponding ones of the outgoing selector SD. The main difference concerns the identification of the calling line, the identification signals being passed directly on to the toll line relay set and do not become associated with the +ve and −ve wires.

The system of calling line identification is based on a direct forward marking method whereby each line is impressed with a marking characteristic of the calling subscriber's number. The characterising signals are connected to the meter wire at the final selector side of the I. D. F. to obtain correct numerical sequence and the actual feed to the wire is via discs of non-linear resistance material, such as the silicon carbide discs described in United States Patent No. 2,292,977. This arrangement allows the non-linear conductivity characteristic to be used to give a static switching effect to allow identity signals to be impressed on engaged line circuits only, thus considerably reducing the power required. The common or feed side of the discs is connected to battery and on free lines the individual end will also be connected to battery. Thus there is no bias voltage across the disc and it constitutes virtually an open circuit. On busy lines the individual side would be connected to earth and this bias renders the disc conducting to the impressed low voltage voice frequency identity signals. Moreover the discs are robust and small in size and if mounted in the manner suggested give a very compact assembly.

Two discs in juxtaposition are used on each subscriber's line to reduce mechanical switching to a minimum. The common side of each pair of discs is connected to a line circuit, while the other side of one disc is commoned for all subscribers in each 100 having the same units digit and the other side of the other disc is commoned for all subscribers in the 100 group having the same tens digit. Thus the 100 wires are statically reduced to 20 commons, 10 for marking the units digit of the subscriber's number and 10 for marking the tens digit. Since the discs are mounted adjacent to the lines to be marked, the amount of cabling involved is very small.

The identity of the calling line is transmitted from St. Mary's to Penrith in code using 2 V. F. signalling currents. A four unit code is employed, each unit being either a mark or a space. The four units are designated W, X, Y and Z and the full code is as follows:

| | |
|---|---|
| 1—W | 6—WY |
| 2—X | 7—WZ |
| 3—Y | 8—XY |
| 4—Z | 9—XZ |
| 5—WX | 0—YZ |

Thus the digit 1 is transmitted by a mark in the W unit and a space in the X, Y and Z units while the digit 9 is transmitted by a space in the W unit, a mark in the X unit, a space in the Y unit and a mark in the Z unit. A signal consisting of a pulse of 600 c./s. current is transmitted between two units and between two digits for synchronising purposes and a mark is transmitted by a pulse of 750 c./s. current, a space being denoted by the absence of signalling current.

Figure 2:
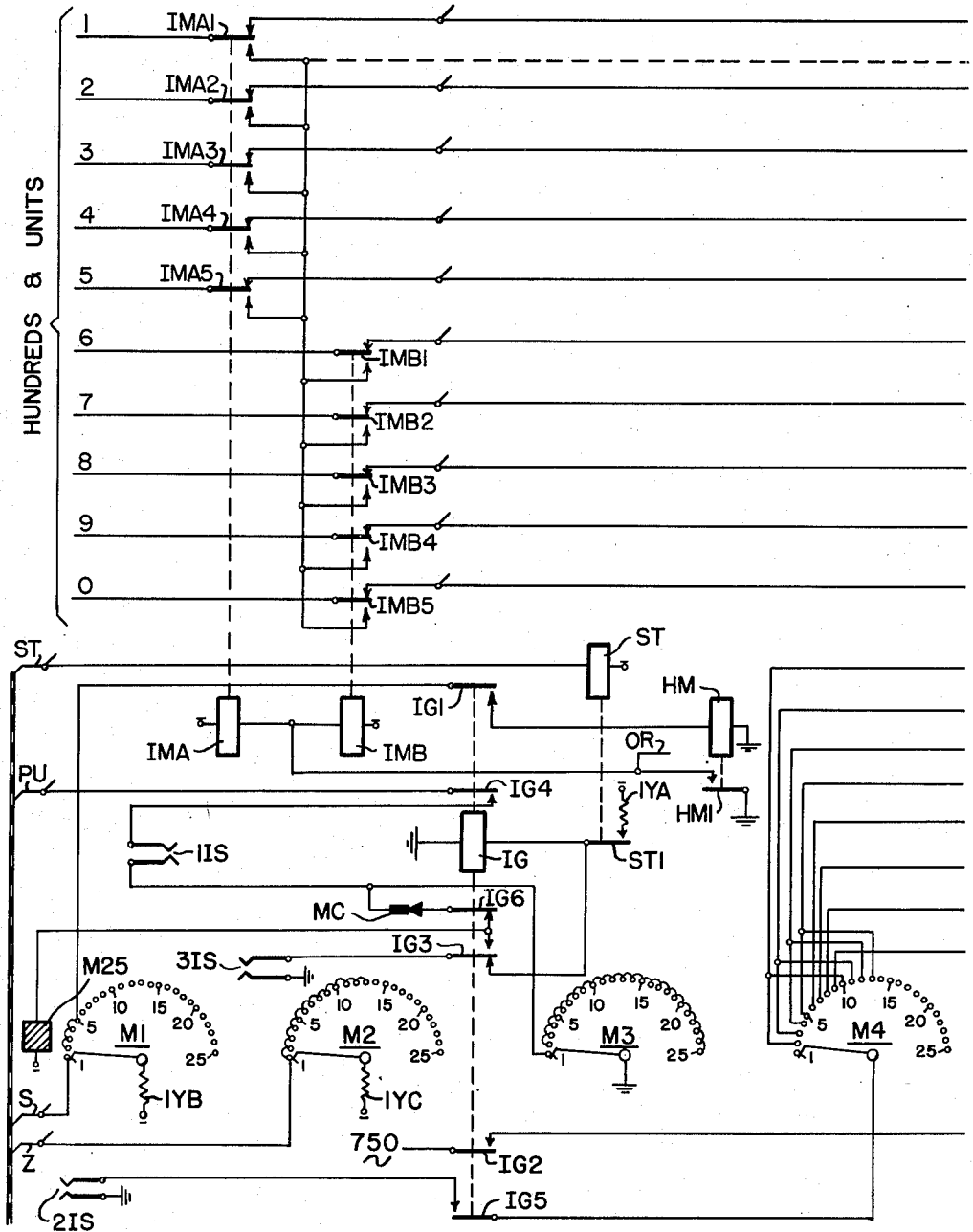
Figs. 2 and 3 show the circuit of the subscribers' line marking equipment SLME which is provided at each exchange.
Figure 3:
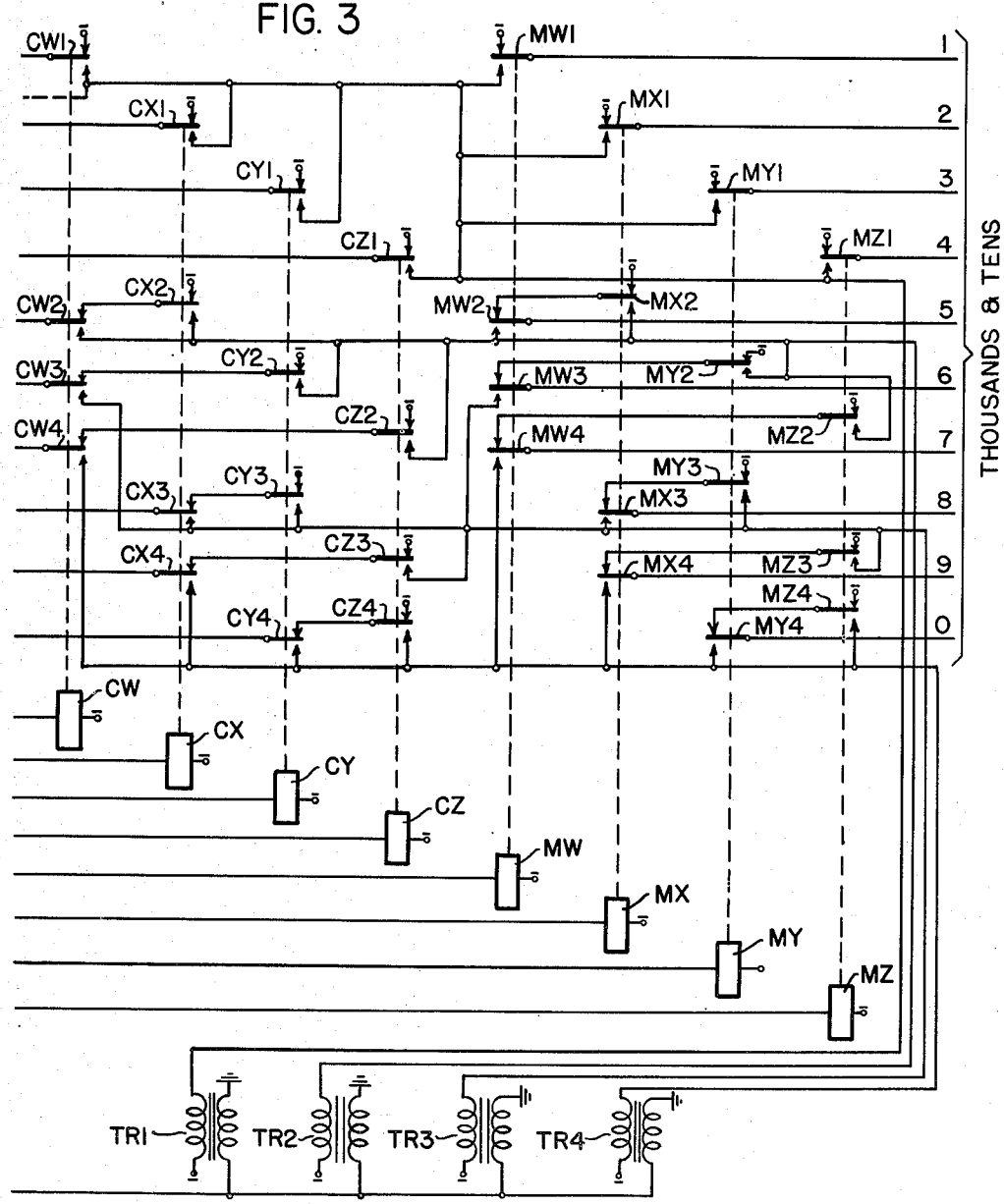

The method of impressing the appropriate identification signals on the commoned wires is shown in Figs. 2 and 3 which should be arranged with Fig. 2 at the left of Fig. 3 to give a complete circuit. The equipment represents a typical line marking equipment for a 3-digit exchange. The tens marking wires are labeled 1 to 0 in Fig. 3 and the wires for a single hundreds group are labeled 1 to 0 in Fig. 2. Since no thousands digit is involved, the marking wires in Fig. 3 are connected directly to contacts of marking relays MW, MX, MY and MZ. A number of hundreds digits is involved, the wires shown in Fig. 2 being those for lines in the first hundreds group while a similar arrangement provided for lines in the other hundreds groups. Changeover relays IMA, IMB and so on are associated with the 10 units wires for each hundred group and it will be seen that with these relays operated all the wires corresponding to each hundreds digit are connected together and the correct marking can be impressed on each by the appropriate operation of relays CW to CZ. With relays IMA, IMB normal the wires of all the subscribers in the exchange having the same units digit are commoned and thus these also can be impressed with the correct marking in a single operation, also by the appropriate operation of relays CW to CZ.

The operation of the line marking equipment is controlled over the three wires ST, S and Z which extend from the auto/auto repeater and are shown in Fig. 2. When the identity of a calling line is required, that is to say when the called party replies, the repeater first tests for the presence of battery on lead S which is only available at the start of an identification cycle when wiper MI is in position 1. When battery is found earth is extended from the auto/auto repeater over lead ST to operate relay ST. The operation of relay ST at contacts ST1 closes a circuit for relay IG which operates when springs 3IS next open. Three sets of impulsing springs are provided of which the springs IIS are employed for the transmission of synchronising signals through the repeater to the identification control relay set ICRS. The second set of springs 2IS control the successive operation of relays CW to CZ and MW to MZ while the third set of springs 3IS control the stepping of the uniselector M. These springs are rendered effective by the operation of contacts IG3, IG4 and IG5. In addition relay IG at contacts IG1 connects relay HM to contacts 2, 3, 4 and 5 of wiper MI and at contacts IG6 opens the homing circuit for the uniselector. Finally at contacts IG2 relay IG connects a source of 750 c./s. signalling current to the primary windings of transformers TR1, TR2, TR3 and TR4.

On the closure of the springs 3IS after the operation of relay IG the magnet of the uniselector M is energised and the wipers are stepped to position 2 when the springs open. In this position battery over resistance YB is extended over wiper MI, contact IG1 to operate relay HM. Relay HM in operating at contacts HM1 operates relays IMA and IMB and also the corresponding relays (not shown) for the second hundreds group over the lead OR. At the remaining contacts HM2 to HM5 similar circuits are closed for the corresponding relays of the remaining hundreds groups. Operation of these relays causes the leads representing the same hundreds group to be connected together and extended to the appropriate contacts of relay CW to CZ. The arrangement shown in Fig. 2 relates to the first hundreds group and in this case the leads 1 to 0 are connected to terminal L and thence by strapping to contacts CW1. The other hundreds groups will be connected to similar L terminals but the strapping from such terminals will be taken to the combination of CW to CZ contacts appropriate to the number of the hundreds group in order that the appropriate marking shall be completed to the leads. For instance the second hundreds group will have a strapping between terminal L and contact CX1 and so on.

On the operation of the springs 2IS with the wipers in position 2 relay CW will be operated and at contacts CW1, 750 c./s. current will be fed through the secondary winding of transformer TR1, through contacts CW1 and operated contacts of relays IMA and IMB to the non-linear resistance discs associated with all lines having the hundreds digit 1. This current is also fed over the secondary winding of transformers TR2, TR3 and TR4, contacts CW2, CW3 and CW4 and operated contacts of other MA and MB relays to the discs connected to lines having the hundreds digits 5, 6, and 7 respectively in accordance with the code given above.

On the next opening of the impulsing springs the switch will be stepped to position 3 and relay CW will release and relay CX will be operated. Signalling current of 750 c./s. will now be fed through the secondary winding of transformer TR1, contacts CX1 and thence through operated contacts corresponding to IMA1 and so on to the discs associated with lines having the hundreds digit 2. The signalling current will also be transmitted over the secondary windings of transformers TR2, TR3 and TR4 through contacts CX2, CX3 and CX4 and thence to lines having the hundreds digits 5, 8 and 9 respectively.

The circuit will continue to operate in this way and the hundreds digit of the calling line will be transmitted according to the four unit code previously mentioned.

When the wipers of the uniselector M step to position 6 relay HM releases following by all the hundreds relays IMA, IMB and so on, thus changing over the circuits associated with the contacts of relays CW to CZ to enable the units digit to be subsequently determined. The tens digit is now determined as the wipers step through positions 6, 7, 8 and 9 by the successive operation of relays MW, MX, MY and MZ over wiper M4. The circuits completed over the contacts of these relays are similar to those completed by the contacts of relays CW, CZ so that the tens digit is also transmitted in the four unit code. The units digit is transmitted as the switch steps through positions 10 to 13 by the reoperation of relays CW to CZ. This completes the transmission of the identification signals and when the switch steps to position 14 battery which has been fed to the Z wire over wiper M2 is now removed from that wire resulting in the removal of earth from the start lead ST and the release of the start relay ST. Following the release of relay ST relay IG also releases and at IG7 completes a homing circuit for the uniselector which thereupon steps to position 1 when the homing circuit is opened. The equipment is now in readiness to perform another identification cycle.

As previously mentioned the marking pulses are of 750 c. p. s. and the spacing pulses, are of 600 c. p. s. It will be seen from examination of the receiving end of the identification equipment, Fig. 14, that these pulses are received on a standard 2 V. F. receiver. The amplification of the unit is high and it will function from a milliwatt of power with a 20 db. loss. Hence the power required per line is extremely small and a single valve oscillator will supply a very large exchange.

The pulses extend over the M wire from the identification resistance block through the line circuit and first selector as described in United States application Serial No. 651,294 filed March 1, 1946, now Patent No. 2,550,208, granted April 24, 1951, to the auto/auto repeater of Fig. 6.

This performs the normal auto/auto repeater functions for repeating impulses and so on to the main exchange. In addition, arrangements are incorporated for appropriating the junction for a brief period when the called subscriber answers, for the transmission of identity signals. The complete identity train occupies a period of slightly over ½ second, and would normally be transmitted while the called party was lifting the receiver to his ear. In the unlikely event of the identification unit already being in use by another call, the period is of the order of 1½ seconds and would hardly be noticed by either subscriber.

Referring now to Fig. 6 relay IA operates when the repeater is seized from the first selector SA (Fig. 1) and closes a circuit for relay IB and also closes a point in the outgoing speaking leads at IA2. Relay IB in operating locks over IB3 and at IB1 earths the private lead. In addition at contacts IB2 relay IB completes the loop over the outgoing leads through impedances II and metal rectifier IMRA and at contacts IB4 operates relay IBB. Relay IBB at IBB2 prepares a circuit for relay IC which is effective on the first incoming impulse. When relay IA releases relay IC in operating completes a circuit for the slow-to-release relay CA and also short-circuits the impedance II and the rectifier IMRA and also the resistance IYC and contacts CAI in order to improve the impulsing circuit. The impulses are repeated from the auto/auto repeater to the toll line relay set TRS–A (Fig. 1) and on the reply of the called subscriber the battery connections to the outgoing speaking leads are reversed thereby causing the operation of relay ID in the auto/auto repeater. Relay ID at contacts ID1 extends earth over contacts ZI1, left hand winding of relay SI to lead S which extends to the subscriber's identification line marking equipment. If the line marking equipment is idle, battery on lead S causes the operation of relay SI which connects the leads Z, PU and ST to the identification equipment. Earth is now extended through contacts SI3 to the lead ST and the identification process is initiated as previously described. In addition relay SI at contacts SI2 and SI6 disconnects the calling end of the connection from the outgoing leads and bridges across these leads the secondary winding of the transformer LT to enable the code signals to be transmitted over the junction to the toll line relay set. The primary winding of this transformer is connected over a change-over contact of a high speed relay HS, either to a source of signalling current having a frequency of 600 c./s. or over the metering lead through one of the resistance discs associated with the calling line and thence through the calling line identification equipment to the source of 750 c./s. signalling current therein. Immediately relay SI operates therefore a spacing pulse of 600 c./s. current is transmitted to prepare the receiving equipment and relay HS is then operated over the lead PU from springs IIS (Fig. 2) to test first marking position. The presence of the 750 c./s signalling current on the metering lead M indicates that the W relay of the first digit storing group is to be operated. Relay HS then releases to send the next 600 c./s. spacing pulse. The X, Y and Z positions are then tested in turn and in this manner the identity signals are passed to the main exchange.

It should be noted that relay ID releases on the operation of relay SI so that thenceforth relay SI is held over the Z lead only. Earth is removed from the Z lead at the end of transmission as previously described and relay SI then releases and restores the repeater for conversational use. Relay ID thereupon reoperates and since relay ZI operates and locks when relay SI first operates, a circuit is now completed for relay IDD which operates and reverses the battery connections over the incoming speaking leads.

The identification control relay set ICRS is shown in Figs. 7 and 8 and acts as a connecting link to the 2 V. F. receiver which responds to the 600 c./s. and 750 c./s. signals. A call from St. Mary's is set up over the toll line relay set TRS–A which is so arranged that the incoming positive and negative wires are extended through the toll line relay set, over the hunting switch H to the V. F. receiver. In the case of a toll call originating in Penrith the toll line relay set TRS–B is used and the incoming positive wire is connected to earth and the negative wire is connected to the metering lead extending from the calling subscriber's line. In both cases the effect on the V. F. receiver is the same and relays X and Y in the V. F. receiver respond to the 750 c./s. and 600 c./s. signals respectively and the resultant earths are distributed over the storage relays in the toll line relay set and to the relays ICW to ICZ in the identification control relay set.

The operation of the identification control relay set is initiated when earth from the toll line relay set is connected to the start conductor ST to cause the operation of the start relay AST (Fig. 8). Relay AST completes a self-interrupting circuit for the magnet of the uniselector H and this operates until the toll line relay set is found when relay AK operates over both windings in series. Relay AK locks over AK3, interrupts the driving circuit for the magnet at AK1 and at AK2 completes a circuit for relay AKR. Relay AKR at AKR3 and AKR6 extends the positive and negative leads to the voice frequency receiver, at AKR7 it opens a further point in the circuit of the driving magnet, at AKR4 it completes a point in the pulsing lead PU and at AKR2 it completes a circuit over ACX6, ACZ1, ACY5 and ACW3, all normal, for relay ACW. Relay ACW operates and locks dependent only on relay ACX and ACW4 it prepares a point in the circuit extending over the lead W to the toll line relay set.

It will be remembered that a 600 c./s. pulse is first transmitted from the identification equipment and this causes the operation of relay AY in the voice frequency receiver. Relay AY closes a circuit for relay AB which operates and completes a circuit for slow-to-release relay ABR. At the end of this pulse relay AY will release and a circuit is completed over its resting contacts, contacts ABR3, ACW2, ACZ7, ACX3 for relay ICX. Relay ACX operates and locks over ACX3 and ACY6 to AKR2 and at ACX6 opens the original locking circuit for relay ACW. This relay however remains held over operated contacts ACX6 and ACW1. The release of relay AY also opens the circuit of relay AB but this relay is rendered slow-to-release by the parallel-connected metal rectifier AMRA. Relay AB thus remains held for the duration of signalling.

If the first digit is 1, 5, 6 or 7, a 750 c./s. pulse will be received in the W position. Relay AX will then operate and earth over contacts of relays AY and AX will be extended over ACY2, ACZ5 and ACW4 to the W lead and thence over wiper H5 and bank contact to operate the W storing relay in the toll line relay set. Relay AY will operate on the next 600 c./s. pulse and again close the circuit for relay AB. The operation of relay AY at this time also opens the holding circuit for relay ACW which thereupon releases but relay ACX remains held over the locking circuit previously traced. Relay AY will release at the end of the 600 c./s. pulse and a circuit is now completed over contacts of relay AY, ABR3, ACW2 normal, ACX operated for relay ACY. Relay ACY operates and locks in a similar manner to relay ACX but relay ACX remains held. The operation of relays ACW to ACZ continues in this manner under the control of relay AY and the contacts of these relays are so arranged that a circuit is prepared successively over the W, X, Y and Z leads extending from the identification control relay set to the toll line relay set, the determination as to whether a circuit is closed over any of these leads being effective by the operation or non-operation of relay AX in response to the reception of a 750 c./s. signal. When relay ACZ operates for the last unit of the first digit, earth is extended over ACZ4, ABR2, AKR4 to the pulsing lead PU extending to the toll line relay set. This causes the energisation of the magnet of a distributor switch the wipers of which are stepped on the release of ACZ to connect up the next group of storage relays for the reception of the next digit. At the end of the transmission of the first digit, relay ACZ is locked and the next release of relay AY will cause the operation of relay ACW this time over contacts ABR3, ACZ1 operated, ACY5 and ACW3 normal. Relay ACW operates with effects as described above and in addition at contacts ACW6 it opens the locking circuit for ACZ which thereupon releases. The cycle is repeated successively as long as signals are received and in this manner the digits comprising the calling subscriber's number are set up on storage relays in the toll line relay set.

If the identification control relay set is taken into use on a call originating at Penrith exchange the toll line relay set TRS-B is arranged to extend an earth pulse over the pulsing lead PU, operated contacts AKR4 and normal contacts ABR2 to operate relay ALC over its right hand winding. Relay ALC locks over its left hand winding, contacts ALC1, ASI2, AOS2 and AMR5 and at contacts ALC2 tests for battery in the line marking equipment as previously explained. If the line marking equipment is available relay ASI operates and at contacts ASI2 opens the locking circuit for relay ALC and closes a holding circuit for itself over its right hand winding so that this relay is now held over the Z wire. In addition relay ASI earths the start lead ST, connects the high speed relay AHS to the pulsing lead PU and finally at contacts ASI4 connects 600 c./s. current over contacts AHS1 to the negative lead extending to the voice frequency receiver 2VFR. The operation from now on is similar to that previously described and 750 c./s. signals are or are not fed to the voice frequency receiver according to the digits of the calling subscriber's number.

At the end of the signal transmission, irrespective of whether the call originates in St. Mary's or Penrith exchanges, relay AB will release followed by relay ABR and battery will normally be removed from the T wire causing the release of relays AK and AKR. The removal of battery from the T wire, however, will only take place if the calling subscriber's number includes the full complement of digits. In mixed digit working the toll line relay set is designed to accept the maximum number of digits and accordingly must be driven over the idle contacts if the subscriber's number contains less digits than this maximum number. Relay AOS in the identification control relay set (Fig. 8) is provided to take care of this case. The right-hand winding of relays AOS is energised over ABR1 and AB1 during the release time of relay ABR after relay AB has released. If relay AKR is still operated, i. e. battery remains on the T wire, relay AOS locks over its left-hand winding and at AOS2 completes a new circuit for operating relay AB when relay ABR has released and at contacts AOS3 prepares a point in the pulsing circuit over wiper H3. Relays AB and ABR now interact and a pulse is transmitted over the pulsing lead when contacts ABR1 and AB1 are in their operated positions i. e. during the release time of relay AB. The distributor uniselector in the toll line relay set is therefore stepped over the idle contacts and when this stepping has been completed battery is removed from the T wire and relays AK and AKR release followed by relay AOS and the remaining relays of the circuit and pulsing is stopped.

Figure 4:
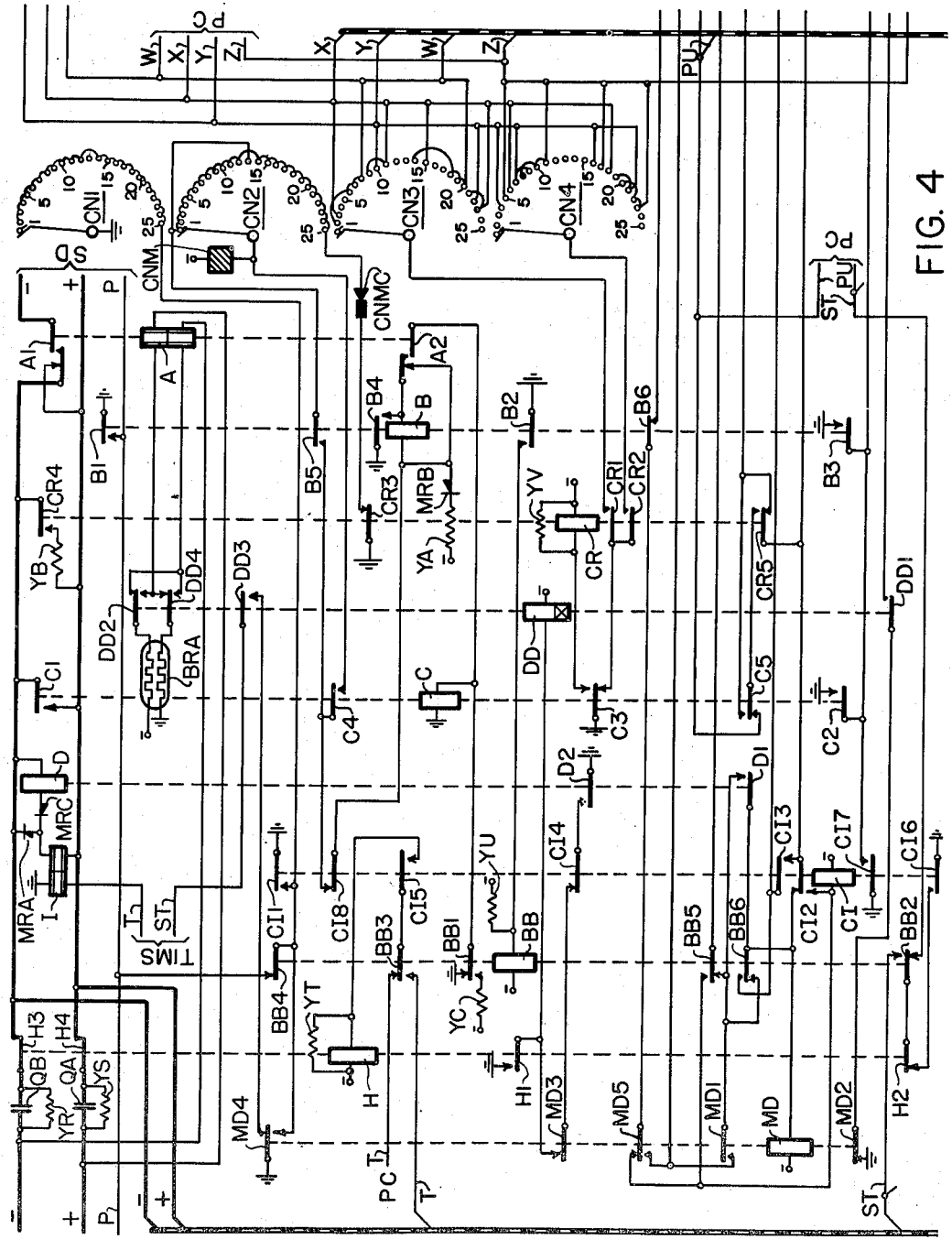
Figs. 4 and 5 show the circuit of a toll line relay set TRS-A for use at Penrith.
Figure 5:
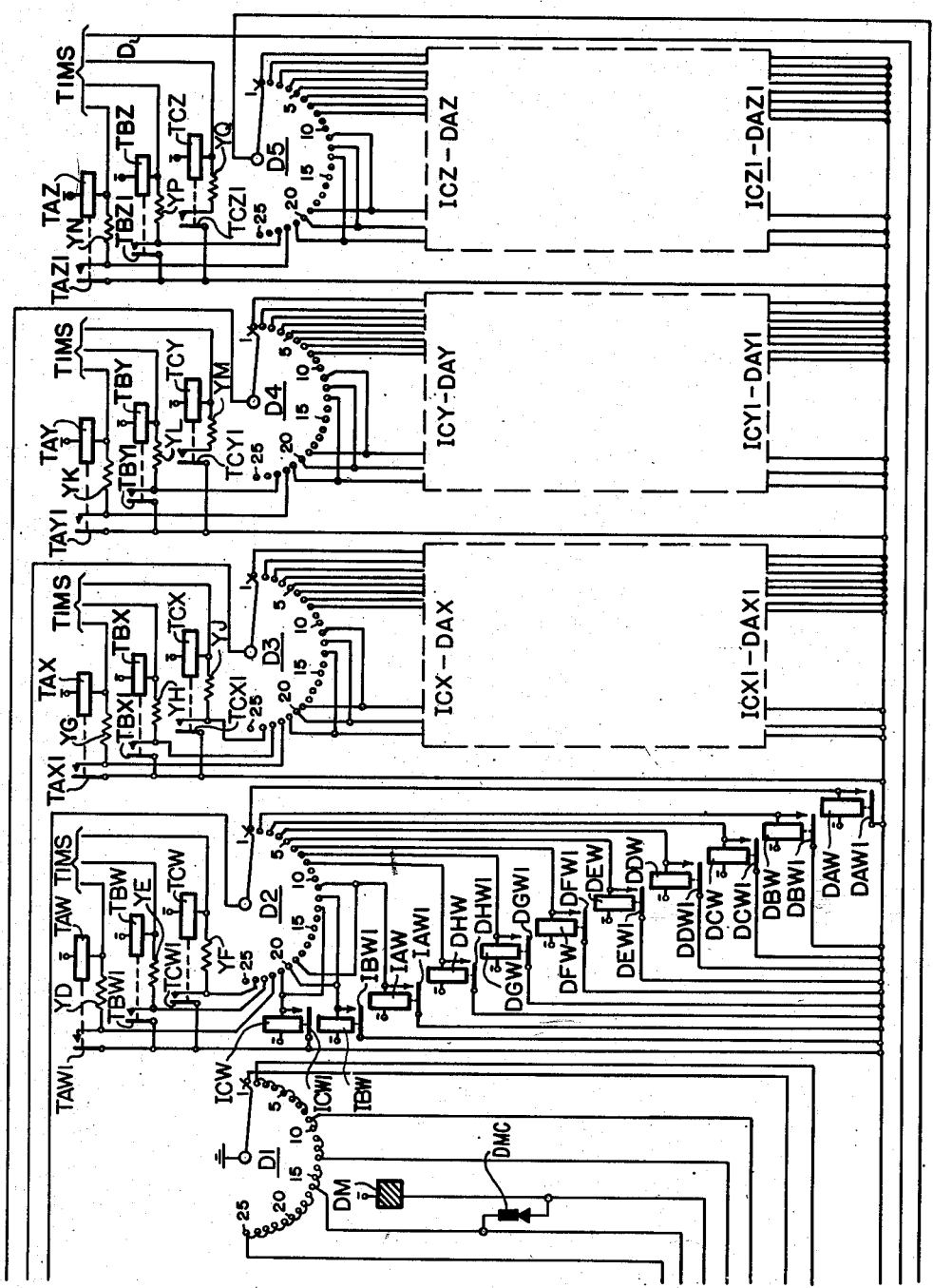

Considering now the functions and method of operation of the toll line relay set shown in Figs. 4 and 5 which should be arranged as shown in Fig. 9, this piece of equipment functions as an impulse repeater and also as a collecting and storing means for the various items of information that it is required to print on the ticket. This information is in the form of digits representing the calling and called numbers and the duration of the call and each digit is stored on a four-unit multiple relay of the type disclosed in United States application Serial No. 664,782, filed April 25, 1946, which virtually comprises four separate small relays each having a single pair of make contacts. The four components which may be operated and locked individually represent the W, X, Y and Z units of the four-unit code described previously. Although one multiple relay is normally required for a digit, in certain cases the relay is unnecessary. For example, the digit 0 of the dialled number is always the same and can be provided by a permanent strapping on the distributor uniselector D.

The toll line relay set shown in the drawings is that which is employed on calls originating at St. Mary's exchange i. e. TRS–A. The toll line relay set TRS–B, which is employed on calls originating at Penrith exchange is in general very similar to the toll line relay set TRS–A. The two major differences between the relay sets have already been mentioned, namely the different method of connecting up the +ve and −ve wires shown in Fig. 4 and the provision in TRS–B of arrangements whereby an earth is fed over the PU wire to the identification control relay set ICRS to cause the operation of relay ALC. It is not proposed to describe the toll line relay set TRS–B in detail.

Referring now to Fig. 4, which shows the impulse repetition part of the toll line relay set, relay A operates when the relay set is seized and at contacts A1 completes a loop through the impedance I and metal rectifier MRA in the usual way. Relay A at contacts A2 (Fig. 4) also completes a circuit for relay B which in operating locks at contact B4 and at contacts B2 completes a circuit for relay BB. Relay B at contacts B1 also places earth on the incoming private wire where the toll line relay set has been seized through a local selector. The incoming impulses are repeated at contacts A1 over the loop to the distant exchange and, at contacts A2, to the magnet CNM of the uniselector CN, relay C operating on the first impulse. The wipers of the switch CN are thus stepped in accordance with the number of impulses in the first digit. It will also be noted that relay C in operating at contacts C3 (Fig. 4) closes a circuit for relay CR which is rendered slow-to-release by the connection of a shunt resistance YV. When relay C releases at the end of the first train of impulses, earth is applied during the release period of relay CR, over contacts C3, CR1 and CR2 to wipers CN3 and CN4. The bank contacts associated with wipers CN3 and CN4 are appropriately wired to wipers D2, D3, D4 and D5 of the distributor uniselector and corresponding contacts of the D wipers are each connected to one winding of a particular four-unit multiple relay. For instance, contacts 1 associated with the four wipers are connected respectively to windings DAW, DAX, DAY and DAZ which form the four units of the first multiple relay. The wiring between the bank contacts of CN3, CN4 and wipers D2, D3, D4 and D5 is so arranged that according to the position to which wipers CN3 and CN4 have been stepped by the first train of impulses so the appropriate winding or windings of the first multiple relay will be energised to store said digit. Each winding in operating locks over its own contact to the common earth at B3.

It should be pointed out at this stage that the wiring of the banks associated with wipers D2, D3, D4 and D5 is identical and that for wiper D2 only has been shown in detail in order to simplify the drawings. It is believed, however, that with the indications given on Fig. 5 there will be little difficulty in following the operation of the circuit.

It will be noted that during the release time of relay CR a circuit is extended over wiper D1, contacts BB6 operated, C12 normal, contacts CR5 operated, C5 normal, distributor magnet DM to battery. The magnet is therefore energised and the wipers will be stepped to position 2 on the release of relay CR so that the next digit will be stored on the multiple relay having windings DBW, DBX, DBY and DBZ. Finally on the release of relay CR an obvious homing circuit is completed over contacts CR3 (Fig. 4) for the CN magnet and the switch wipers are stepped to position 13 and the second digit is registered on the second half of the bank. The second digit is stored in a similar manner to the first and the distributor uniselector is stepped on the release of relay CR, over a circuit from wiper D1 in position 2, operated contacts CR5 and thence as before. The toll line relay set has been arranged to cater for a called number having eight digits and on the reception of the last digit the wipers of the distributor uniselector will be stepped to position 9 in which position a circuit is completed from earth on wiper D1 in position 9 (Fig. 5), contacts CR5, C12, winding of relay MD to battery. Relay MD operates and at contacts MD3 prevents the operation of relay DD (Fig. 5) when relay D operates. The purpose of contacts MD2 (Fig. 4) will be described later.

If the calling subscriber hangs up before he has completed dialling, due, for instance, to the dialling of a wrong number, the toll line relay set is restored to normal, wiper CN1 and contacts MD4 guarding the circuit against seizure until the switches CN and D are returned to their normal position.

The circuit remains in this condition until the called party removes his receiver when relay D will operate over the loop and at contacts D1 earth will be extended over contacts MD1, magnet springs DMC to the magnet and the distributor uniselector will step to position 11. Relay MD thereupon releases and relay CI operates. Relay CI will operate before relay MD releases since the latter relay is slow to release so that the operation of relay DD is still prevented. Relay CI at contacts CI6 (Fig. 4) earths the start lead ST extending to the identification control relay set to cause the hunting switch associated with the latter circuit to operate to find the toll line relay set as previously described. When this has taken place, earth is extended over the T lead (Fig. 4) from the identification control relay set and relay H then operates over contacts BB3 and CI5 operates. The identification control relay set is now ready to receive the calling number so that relay DD is allowed to operate to extend battery reversal to the auto/auto repeater to initiate identification and the transmission of the calling number as previously described. The operation of relay DD is effected by the closing of contacts H1 (Fig. 4) and the battery reversal occurs at contacts DD1 and DD2. In addition relay H at contacts H3 and H4 (Fig. 4) opens the speaking connection over the outgoing line to prevent the voice frequency signals from being extended to the distant exchange and finally, at contacts H2 (Fig. 4), relay H disconnects earth from the start lead ST leading to the identification control relay set.

In the toll line relay set TRS–A which is used on calls originating in St. Mary's exchange the positive and negative leads shown in Fig. 4 are connected to the incoming positive and negative speaking leads so that the voice frequency signals representing the calling subscriber's number passes from the junction line directly to the identification control relay set where they are decoded and passed to the toll line relay set over leads W, X, Y and Z as previously described. The first digit of the calling party's number is stored on the multiple relay IAW, IAX, IAY and IAZ. When the first digit has been received earth is applied to the PU wire in the identification control relay set as previously described to cause the distributor switch D to step and connect with the next multiple relay IBW, IBX, IBY and IBZ and this is set according to the second digit of the calling subscriber's number. In this way the complete number of the calling subscriber is set up digit by digit and when all the digits have been received, three in the arrangement shown, the uniselector D will be stepped to position 14 whereupon it is advanced by self-interruption to position 17. Relay CI releases when the switch moves to position 14, relay CI opening the circuit for relay H thereby removing battery from the T wire to release the identification control relay set as previously explained.

The operation of the toll line relay set TRS–B which is taken into use when a call originates at Penrith exchange, is very similar to that described above and the main difference resides in the fact that positive lead shown in Fig. 4 is connected to earth and the negative lead is connected to the metering wire and the signals are transmitted from subscriber's line circuit over this wire through toll line relay set to the identification control relay set.

The operation of relay DD which as described above takes place when the identification control relay set has been associated with the toll line relay set also serves to associate the timing relay set TIMS (Fig. 1) with the toll line relay set. This is effected by earth extended over contacts MD4 and DD3 to the start lead ST and also by earth extended over contacts MD2 and DD1 to lead D. It will be noted that MD contacts are provided in series with relay DD and also in series with DD contacts in the ST and D leads extending to the timing relay set. This is to release the timing relay set as soon as possible if the calling party releases during an identification cycle. Relay DD has been operated by relay H and the timing relay set has therefore been set in operation. When the calling party hangs up relay BB will release followed by CI to initiate the release of the identification control relay set and relay MD will operate and open the circuits to the timing relay set. The duration of the call is stored on the three multiple relays TAW, X, Y, Z; TBW, X, Y, Z and TCW, X, Y, Z which are used for registering tenths of minutes, minutes and tens of minutes respectively. It is arranged that all three items are printed on the ticket though the only reason for printing tenths of minutes is that it allows the administration latitude in determining the length of time which shall be allowed to lapse for the subscriber to clear from the connection on an unwanted call, e. g. a wrong number, without being charged for it. These three relays are similar to the other storage relays except that a resistance is inserted in the locking circuit which permits them to be shunted down as well as operated over their controlling wires from the timing relay set.

The timing relay set is not shown in the present application since its principles of operation are fully described in United States application Serial No. 672,387, filed May 27, 1946. Briefly the circuit consists of a uniselector which serves eight toll line relay sets, each taking up three sets of bank contacts for marking leads TAW, TBW, TCW and so on. The switch is operated continuously and the relay set functions to test the digit stored on the multiple relays in the toll line relay set and to control the operation of the storage relays at appropriate intervals so that the digit stored thereon is increased by one. It will thus be understood that the timing relay set is associated with the toll line relay set for the duration of the connection and as the storage relays will have no digit stored thereon at the beginning of the conversation they will be progressively controlled by the timing relay set to store the digits 1, 2, 3 and so on.

The timing relay set is also arranged to provide a warning signal 12 seconds before the end of the 3 minute period. This signal is applied to lead T, Fig. 4, to the right hand winding of the impedance I and is fed to the speaking leads by induction over the left hand winding.

When the connection is released relay A will release followed by relays B and BB so that with wiper D1 in position 17 a circuit is closed over B6 and MD5 for relay CI. Relay CI busies the toll line relay set at CI1 and again completes starting and marking circuits but this time owing to the fact that relay BB is released these circuits extend to the printer controller instead of the identification control relay set. Now the wipers of switch D are at present in position 17 and as seen from Figs. 4 and 5, the switch has to step to position 19 before the first digit is transferred to the printer controller. Positions 17 and 18 are spare positions provided in case it is required to insert at least one digit representing the exchange code. This insertion may be effected by a suitable strapping in the printer controller but in any case the printer controller is arranged to transmit two pulses at suitable intervals over the PU wire to cause the switch D to be stepped from position 17 to 19.

The appropriate markings are now extended over wires D2, D3, D4 and D5 in position 19 to cause the first digit of the calling party's number to be printed, the earth for extending these markings being obtained from contacts CI7. On the completion of the printing of each digit an earth pulse is transmitted from the printer controller over pulsing lead PU to operate the magnet DM and cause the distributor switch to make one step. The digits of the calling subscriber's number are thus printed as the switch D steps from position 19 to position 21 while the duration of the call is printed while the switch steps from contacts 22 to 24. Two further pulses are now transmitted from the printer controller to the magnet DM and the switch is stepped through position 25 to position 1, relay CI being maintained operated in the latter position over contacts CI3 and CI2. The called subscriber's number is then transferred through the printer controller to the printer while the switch steps from position 1 to position 8. When the called party's number has been completely transmitted the distributor switch steps to position 9, whereupon relay CI releases. A circuit is now closed for relay MD which at contacts MD1 completes a self-interrupting circuit for the distributor magnet and the switch steps automatically to position 11. The circuit for relay MD now extends over BB5 and BB6 and the switch is stepped to position 14, relay MD being held over MD1 and BB6. The switch thus steps to position 17, relay MD being held over B6, MD5, MD1 and BB6. The switch is then stepped through position 25 to position 1 where relay MD releases and, all the other relays having been released guarding earth at MD4 is removed and the circuit is free to be seized for another call.

I claim:

1. In a telephone system, a calling line, a trunk line, a speech transmission path for said trunk line, a connection including said speech transmission path extended from said calling line over said trunk line, equipment operative to transmit line identification signals corresponding to the identity of said calling line over said speech transmission path, control means for disconnecting said speech transmission path from said calling line and for connecting said equipment to said speech transmission path, and means responsive to a signal transmitted over said speech transmission path to said trunk line for operating said control means and for operating said equipment to transmit said line identification signals over said speech transmission path.

2. In a telephone system, a connecting line between two exchanges, a calling line in one of said exchanges, line identification equipment operative to transmit voice frequency signals corresponding to the identity of said calling line, a connection extended over said connecting line from said calling line to the other of said exchanges, means operated in response to a signal from said other exchange for transferring said connecting line from said calling line to said line identification equipment, means for operating said line identification equipment thereafter to transmit over said connecting line voice frequency signals identifying said calling line.

3. In a telephone system, two exchanges, a trunk line including a talking path extending from one of said exchanges to the other of said exchange, a control lead and a transformer having a plurality of windings associated with said trunk line, a source of voice frequency potential, means for extending a connection over said trunk line from one of said exchanges to the other of said exchanges, signal control means operated responsive to a signal transmitted over said talking path from said other exchange for connecting one winding of said transformer to said talking path and for connecting said source of voice frequency potential to another winding of said transformer, and means for disconnecting said other winding of said transformer from said potential and for connecting said other winding of said transformer to said control lead.

4. A telephone system as set forth in claim 3 including a second source of voice frequency potential and line identification equipment controlled by said signal responsive means for connecting said second source of voice frequency potential to said control lead each time said control lead is connected to the other winding of said transformer.

5. In a telephone system, two exchanges, a trunk line including a talking path connecting said exchanges, a calling line in one of said exchanges, a called line, line identification equipment operative to transmit signals corresponding to the identity of a calling line, a connection extended over said trunk line from said calling line to the called line, a relay for transferring said talking path from said calling line to said line identification equipment, means for operating said relay to transfer said talking path in response to answering at said called line, means for operating said line identification equipment thereafter to transmit signals over said talking path to identify said calling line, and means in said line identification equipment for controlling said relay to terminate said transfer after said signals are transmitted.

6. In a telephone system, a calling line, a trunk line including a speech transmission path, a connection extended from said calling line over said trunk line, line identification equipment operative to identify said calling line and to transmit voice frequency signals corresponding to the identity of said calling line, means for momentarily disconnecting said speech transmission path from said calling line and for connecting said equipment to said speech transmission path responsive to the answer signal at the called end of said connection, means for operating said equipment thereafter to transmit said voice frequency signals over said speech transmission path in accordance with the identity of said calling line, and means operated under control of said equipment for transferring said speech transmission path from said equipment to said calling line after said signal is transmitted.

7. In a telephone system having facilities for automatically recording information for charging purposes, a calling line, a trunk line, a connection from said calling line extended over said trunk line, voice frequency equipment for transmitting different frequencies, calling line identification equipment, a relay, means for returning a signal over said trunk line to the calling end of said connection to operate said relay, means responsive to operation of said relay for transferring said trunk line from said calling line to said voice frequency equipment and for connecting one of said frequencies to said trunk line, means controlled by said transfer means for operating said line identification equipment for connecting another of said frequencies to said trunk line, and means for controlling the time interval between the connections of said different frequencies to said trunk line.

8. In a telephone system, a calling line, a trunk line, a connection from said calling line over said trunk line, voice frequency transmitting equipment for transmitting voice frequency pulses of different frequencies, calling line identification equipment, a relay, means for returning a signal over said trunk line to the calling end of said connection in order to operate said relay, means responsive to said operation of said relay for transferring said trunk line from said calling line to said voice frequency transmitting equipment, means controlled by said transfer means for initiating operation of said voice frequency transmitting equipment in order to transmit said different voice frequency pulses, means also controlled by said transfer means for connecting one of said different voice frequency pulses to said trunk line, and means in said line identification equipment for controlling the transmission of at least one pulse of said one frequency to said trunk line after the transmission of at least one pulse of another of said frequencies to said trunk line in order to control the spacing interval between successive pulses of said other frequency.

9. In a telephone system, two exchanges, a calling line in one of said exchanges, a trunk line including a talking path extending between said exchanges, a control lead over which signals are transmitted indicative of a calling subscriber plural digit directory number, a source of voice frequency potential, a connection extended from said calling line over said trunk line to the other of said exchanges, signal responsive means operated in response to a signal transmitted over said trunk line for disconnecting said calling line from said trunk line and for connecting said voice frequency potential to said trunk line, and means controlled by said signal responsive means for thereafter connecting said control lead to said trunk line in order to transmit said signals indicative of the digits of said calling line directory number over said trunk line to said other exchange.

10. A telephone system as set forth in claim 9 including a second source of voice frequency potential and line identification equipment controlled by said signal responsive means for momentarily connecting said second source of voice frequency potential to said control lead at least one time for each digit in order to transmit in code form each digit of said calling subscriber plural digit directory number.

11. In a telephone system, a calling subscriber line, a called subscriber line, switching apparatus, means for controlling said switching apparatus to set up a telephone connection from said calling line to said called line, line identification apparatus operative to identify said calling line and for transmitting signals corresponding to said calling line identity over a portion of said connection, control means in said switching apparatus operated over said called line for temporarily disconnecting said calling line from said connection to said called line, means controlled in response to the operation of said control means for operating said identification apparatus, means for registering said calling line identification signals transmitted by said identification apparatus, and additional means in said identification apparatus for controlling said control means to reconnect said calling line to said called line after said signals are transmitted.

12. In a telephone system, a calling subscriber line, a called subscriber line, switching apparatus, a trunk line, means for controlling said switching apparatus to set up a telephone connection from said calling line to said called line via said trunk line, line identification apparatus operative to identify said calling line and to transmit signals corresponding to the identity of said calling line over said trunk line, control means, said control means operated over said called line for disconnecting said calling line from said trunk line and for completing a direct connection between said line identification apparatus and said trunk line, means operated in response to the operation of said control means for operating said line identification apparatus to identify said calling line and to transmit said signals over said trunk line via said direct connection, and means controlled in response to the termination of the transmission of said signals for reconnecting said trunk line to said calling line in order to complete a talking connection between said lines.

GEORGE THOMAS BAKER.

REFERENCES CITED

The following references are of record in the file of this patent:

UNITED STATES PATENTS

| Number | Name | Date |
|---|---|---|
| 2,228,113 | Hershey | Jan. 7, 1941 |
| 2,252,766 | Holden | Aug. 19, 1941 |
| 2,265,844 | Korn | Dec. 9, 1941 |
| 2,270,246 | Bascom et al. | Jan. 20, 1942 |
| 2,273,165 | Wright | Feb. 17, 1942 |
| 2,281,508 | Lundstrom | Apr. 28, 1942 |
| 2,283,610 | Mohr | May 19, 1942 |
| 2,286,445 | Taylor et al. | June 16, 1942 |
| 2,292,977 | Taylor | Aug. 11, 1942 |
| 2,297,365 | Ostline | Sept. 19, 1942 |
| 2,369,071 | Ostline | Feb. 6, 1945 |
| 2,369,868 | Taylor et al. | Feb. 20, 1945 |
| 2,370,736 | Kittredge | Mar. 6, 1945 |
| 2,373,908 | Ostline | Apr. 17, 1945 |
| 2,387,897 | Grandstaff | Oct. 30, 1945 |
| 2,437,118 | Ostline | Mar. 2, 1948 |
| 2,531,637 | Miller | Nov. 28, 1950 |